(12) United States Patent
Huang et al.

(10) Patent No.: US 12,367,128 B2
(45) Date of Patent: Jul. 22, 2025

(54) METHOD FOR AUTOMATICALLY GENERATING INTERACTIVE TEST CASES

(71) Applicant: SOUTH CHINA UNIVERSITY OF TECHNOLOGY, Guangzhou (CN)

(72) Inventors: Han Huang, Guangzhou (CN); Jie Cao, Guangzhou (CN); Lei Ye, Guangzhou (CN); Fangqing Liu, Guangzhou (CN); Zhifeng Hao, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 235 days.

(21) Appl. No.: 18/255,593

(22) PCT Filed: Oct. 8, 2021

(86) PCT No.: PCT/CN2021/122578
§ 371 (c)(1),
(2) Date: Jun. 2, 2023

(87) PCT Pub. No.: WO2022/116681
PCT Pub. Date: Jun. 9, 2022

(65) Prior Publication Data
US 2024/0104006 A1    Mar. 28, 2024

(30) Foreign Application Priority Data
Dec. 2, 2020 (CN) .......................... 202011392991.4

(51) Int. Cl.
*G06F 11/3668* (2025.01)
(52) U.S. Cl.
CPC ................. *G06F 11/3684* (2013.01)
(58) Field of Classification Search
CPC ............. G06F 11/3684; G06F 11/3696; G06F 11/3688; G06F 9/451; Y02D 10/00
(Continued)

(56) References Cited

U.S. PATENT DOCUMENTS 9,600,401 B1 * 3/2017 Haischt ................. G06F 3/0484
2003/0005413 A1   1/2003 Beer
(Continued)

FOREIGN PATENT DOCUMENTS

| CN | 104090844 | 10/2014 |
| CN | 104699608 | 6/2015 |

(Continued)

OTHER PUBLICATIONS

Memon, Atif M., Ishan Banerjee, and Adithya Nagarajan. "GUI ripping: reverse engineering of graphical user interfaces for testing." Wcre. vol. 3. 2003. pp. 1-10 (Year: 2003).*
(Continued)

*Primary Examiner* — Satish Rampuria
(74) *Attorney, Agent, or Firm* — JMB Davis Ben-David

(57) ABSTRACT

Disclosed is a method for automatically generating interactive test cases. The method comprises: after a UI of an application program is displayed, traversing all views in a view tree corresponding to the UI of the application program, and recording a path, in the view tree, of each view therein that can be clicked on, so as to obtain a set of path information, in the view tree, of all the views that can be clicked on in the UI; and respectively generating a corresponding test case for each piece of path information in the set: in the test case, according to path information, in the view tree, of a view under test, finding the view in the UI interface of the application program, and triggering a click event therefore, that is, completing a click interaction test on the view.

3 Claims, 3 Drawing Sheets

(58) Field of Classification Search
USPC .................................................. 717/120–178
See application file for complete search history.

(56) References Cited

U.S. PATENT DOCUMENTS

2013/0117731 A1* 5/2013 LeSuer ............... G06F 11/3672
717/125
2019/0004934 A1 1/2019 Huchegowda
2020/0104243 A1* 4/2020 Lee-Smith .......... G06F 11/3688

FOREIGN PATENT DOCUMENTS

| | | |
|---|---|---|
| CN | 105677570 | 6/2016 |
| CN | 106294167 | 1/2017 |
| CN | 106649100 | 5/2017 |
| CN | 107608890 | 1/2018 |
| CN | 108345485 | 7/2018 |
| CN | 108459967 | 8/2018 |
| CN | 109857668 | 6/2019 |

OTHER PUBLICATIONS

Amalfitano, Domenico, et al. "Using GUI ripping for automated testing of Android applications." Proceedings of the 27th IEEE/ACM International Conference on Automated Software Engineering. 2012.pp. 258-261 (Year: 2012).*

Hu, Gang, Linjie Zhu, and Junfeng Yang. "AppFlow: using machine learning to synthesize robust, reusable UI tests." Proceedings of the 2018 26th ACM Joint Meeting on European Software Engineering Conference and Symposium on the Foundations of Software Engineering. 2018. pp. 269-282 (Year: 2018).*

Jian Xu, "GPU-based parallel collaborative filtering algorithm", Application Research of Computers, vol. 30, No. 9, pp. 2656-2659, Sep. 24, 2013 (Sep. 24, 2013).

* cited by examiner

METHOD FOR AUTOMATICALLY GENERATING INTERACTIVE TEST CASES

CROSS-REFERENCE TO RELATED APPLICATIONS

This is the U.S. National Stage of International Patent Application No. PCT/CN2021/122578 filed on Oct. 8, 2021, which claims the benefit of Chinese Patent application Ser. No. 202011392991.4 filed on Dec. 2, 2020.

FIELD OF THE INVENTION

The present disclosure pertains to the technical field of software testing, and specifically, to a method for the automated generation of interactive test cases.

BACKGROUND OF THE INVENTION

Generation of test cases is the cornerstone of software testing. The diversity, large scale, and complexity of the code space of test cases will often lead to substantial computational costs for generation of test cases, affecting efficiency of testing processes. According to a manifold optimization-based algorithm for automatically generating software test cases, when the automatic test case generation-path coverage (ATCG-PC) problem is solved, the code space M of test cases needs to be acquired first, and then test cases satisfying constraints are acquired through manifold optimization. When the manifold optimization-based algorithm for automatically generating software test cases is applied to modern application programs, due to the diversity of interactive modes of users and the complexity of a user interactive interface, how to effectively obtain the code space M of test cases is an engineering problem that needs to be solved. A manual test case encoding method not only requires increased manpower input, but also may cause omissions.

SUMMARY OF THE INVENTION

In view of the requirement for application of the manifold optimization-based algorithm for automatically generating software test cases to modern application programs, the present disclosure provides a method for automatically generating interactive test cases, according to which test cases related to user click interactions are automatically generated by traversing clickable views in a user interface (UI) of an application program.

The objective of the present disclosure may be achieved through the following technical solution.

A method for automatically generating interactive test case is provided, according to which test cases related to user click interactions are automatically generated by traversing clickable views in a user interface (UI) of an application program. The method includes the following steps:

T1: traversing all clickable views in a user interface (UI) of an application program to obtain a traversal result, specifically including:
    traversing all views in a view tree corresponding to the UI of the application program after the UI of the application program is displayed, and recording paths of clickable views in the view tree to obtain a set of path information of all clickable views in the view tree corresponding to the UI; and T2: automatically generating test cases corresponding to click events according to the traversal result obtained in step T1, specifically including:
    respectively generating a corresponding test case for each piece of path information in the set of path information, finding, in the test case, a to-be-tested view in the UI of the application program according to path information of the view in the view tree, triggering a click event of the view to complete a click interaction test on the view, writing a code corresponding to the operation into a test case file, and generating a test case corresponding to the view.

Further, step T1 includes:
T11: displaying a UI of a to-be-tested application program in a test program;
T12: acquiring a root view in a view tree corresponding to the UI;
T13: traversing all views in the view tree from the root view;
T14: using a stack as a data structure for recording position information of child views in order to effectively show a position of each child view in the view tree during traversal, first, defining an index of the root view as 0, defining an index of the first child view under the same parent view as 0, defining an index of the second child view as 1, and so on; when a new view in the tree structure is traversed, if the new view is the first view in all child views under the same parent view, pushing an index of the new view into the stack, if the new view is a view other than the first view in all child views under the same parent view, popping the top of the stack first and then pushing the index of the new view into the stack, and in a case of returning to traverse an upper level in the view tree, popping the top of the stack; and using index information (s0, s1, s2, . . . ) stored in the stack from the bottom to the top at each moment to represent information of a path from the root view in the view tree to a current view;
T15: during traversal, determining whether a current child view is clickable by querying an attribute of the current child view, and for a clickable view, recording path information (s0, s1, s2, . . . ) of the view in the view tree that is stored in the stack; and
T16: after the whole view tree is traversed, obtaining a set of path information of all clickable views in the view tree.

Further, step T2 includes:
T21: respectively automatically generating a test case corresponding to each piece of path information in the set according to the set of path information of clickable views in the view tree that is obtained by traversing all clickable views in the UI of the application program;
T22: when a test case is generated each time, extracting a piece of path information (s0, s1, s2, . . . ) from the set of path information, the first value in the data queue representing the root view in the view tree, and each following value representing an index in a view at a lower level in the view tree corresponding to a child view on the path; and quickly finding a to-be-tested view by the index method;
T23: after the to-be-tested view is found, triggering a click event of the view;
T24: writing a code corresponding to the operations of step T22 and step T23 into a test case file, and generating a test case corresponding to the view; and T25: repeating step T22 to step T24 until test cases corresponding to all paths in the set of path information are generated.

Compared with the prior art, the present disclosure has the following advantages and effects:

According to the present disclosure, clickable views are traversed based on a simulation environment instead of a real machine and device environment, realizing quick parallel processing.

DETAILED DESCRIPTION OF THE EMBODIMENTS

In order to make the objective, technical solutions, and advantages of the embodiments of the present disclosure clearer, the technical solutions in the embodiments of the present disclosure will be clearly and completely described below with reference to the drawings in the embodiments of the present disclosure. Obviously, the described embodiments are some but not all of embodiments of the present disclosure. All other embodiments obtained by those of ordinary state-of-the-art based on the embodiments of the present disclosure without involving any inventive effort shall fall within the scope of protection of the present disclosure.

Embodiment

According to the manifold optimization-based algorithm for automatically generating software test cases, when the automatic test case generation-path coverage (ATCG-PC) problem is solved, the code space M of test cases needs to be acquired first, and then test cases satisfying constraints are acquired through manifold optimization. This embodiment provides a method for automatically generating test cases related to user interactions, according to which application of manifold optimization-based automatic software test case generation to modern application programs is realized to improve the acquisition efficiency of the code space M of test cases.

Figure 1:
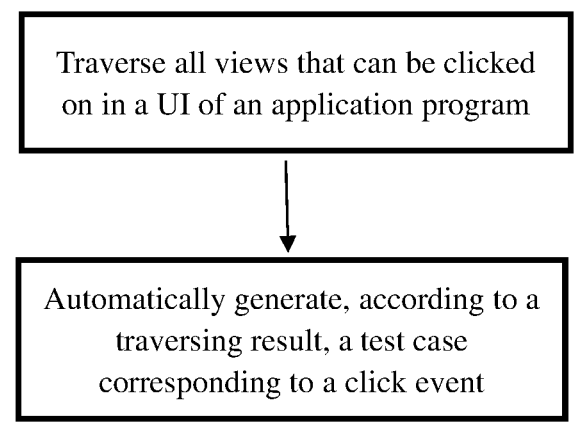
FIG. 1 is a flowchart of a method for automatically generating interactive test cases according to an embodiment of the present disclosure.

As shown in FIG. 1, according to the method, test cases related to user click interactions are automatically generated by traversing clickable views in a user interface (UI) of an application program, and the method includes the following steps:

T1: all clickable views in a user interface (UI) of an application program are traversed to obtain a traversal result, which specifically includes:

all views in a view tree corresponding to the UI of the application program are traversed after the UI of the application program is displayed, and paths of clickable views in the view tree are recorded to obtain a set of path information of all clickable views in the view tree corresponding to the UI; and T2: test cases corresponding to click events are automatically generated according to the traversal result obtained in step T1, which specifically includes:

a corresponding test case is respectively generated for each piece of path information in the set of path information, a to-be-tested view in the UI of the application program is found in the test case according to path information of the view in the view tree, a click event of the view is triggered to complete a click interaction test on the view, a code corresponding to the operation is written into a test case file, and a test case corresponding to the view is generated.

Figure 2:
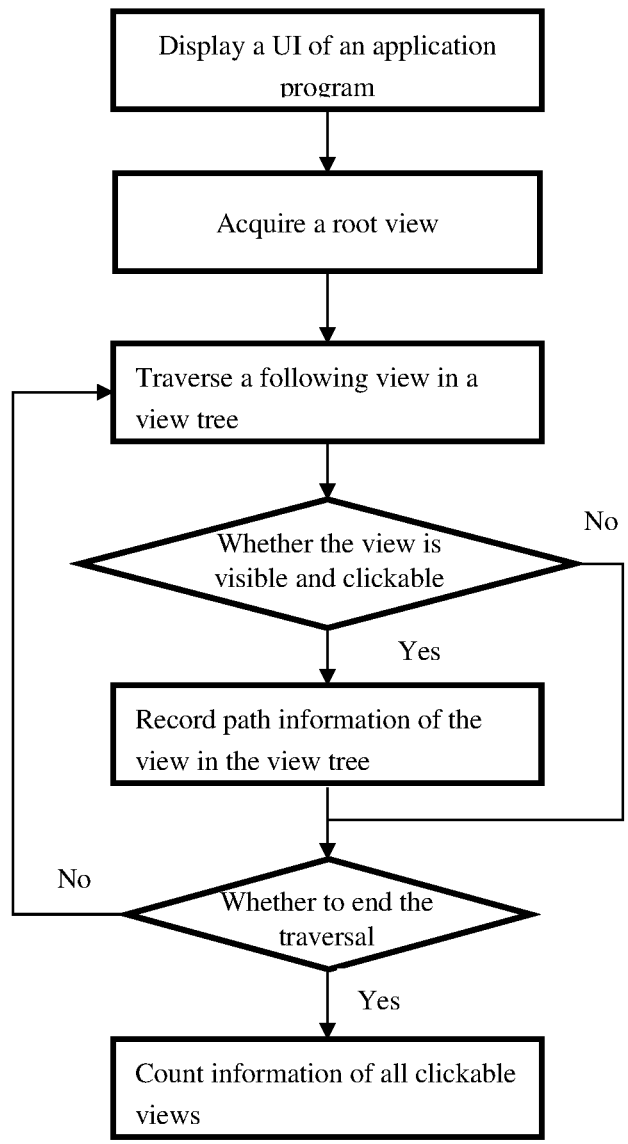
FIG. 2 is a flowchart of traversal of all clickable views in a user interface (UI) of an application program according to an embodiment of the present disclosure.

As shown in FIG. 2, the main process of traversing the clickable views in the UI of the application program includes the following sub-steps:

T11: a UI of a to-be-tested application program is displayed in a test program;

T12: a root view in a view tree corresponding to the UI is acquired;

T13: all views in the view tree are traversed from the root view;

T14: a stack is used as a data structure for recording position information of child views in order to effectively show a position of each child view in the view tree during traversal, first, an index of the root view is defined as 0, an index of the first child view under the same parent view is defined as 0, an index of the second child view is defined as 1, and so on; when a new view in the tree structure is traversed, if the new view is the first view in all child views under the same parent view, an index of the new view is pushed into the stack, if the new view is a view other than the first view in all child views under the same parent view, the top of the stack is popped first and then the index of the new view is pushed into the stack, and in a case of returning to traverse an upper level in the view tree, the top of the stack is popped; and index information ($s0$, $s1$, $s2$, . . . ) stored in the stack from the bottom to the top at each moment is used to represent information of a path from the root view in the view tree to a current view;

T15: during traversal, whether a current child view is clickable is determined by querying an attribute of the current child view, and for a clickable view, path information ($s0$, $s1$, $s2$, . . . ) of the view in the view tree that is stored in the stack is recorded; and T16: after the whole view tree is traversed, a set of path information of all clickable views in the view tree is obtained.

Figure 3:
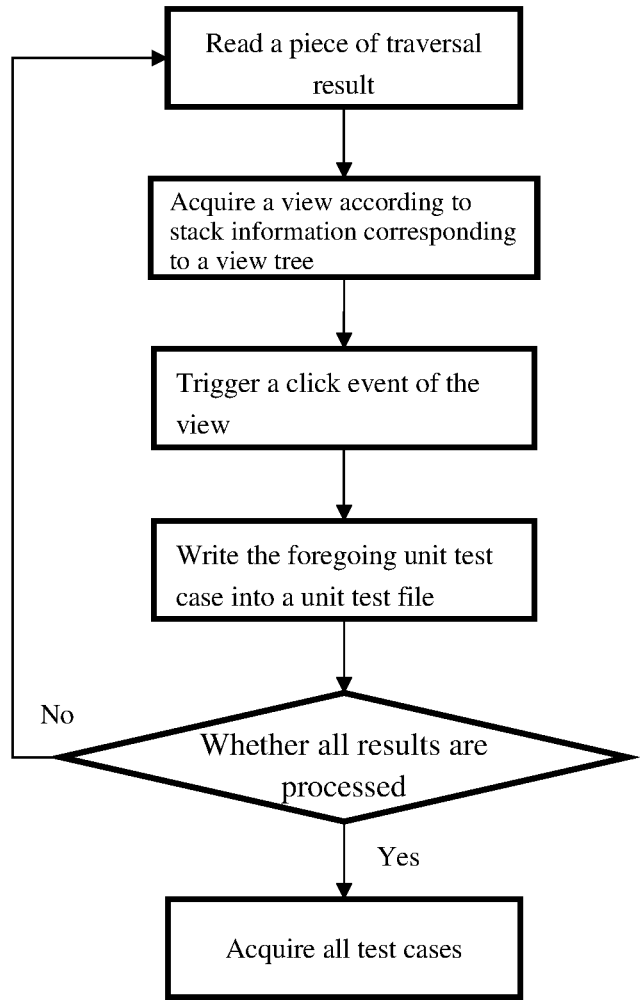
FIG. 3 is a flowchart of automatic generation of test cases corresponding to click events according to a traversal result according to an embodiment of the present disclosure.

As shown in FIG. 3, the main process of automatically generating the test cases corresponding to the click events according to the traversal result includes the following sub-steps:

T21: a test case corresponding to each piece of path information in the set is respectively automatically generated according to the set of path information of clickable views in the view tree that is obtained by traversing all clickable views in the UI of the application program;

T22: when a test case is generated each time, a piece of path information ($s0$, $s1$, $s2$, . . . ) is extracted from the set of path information, the first value in the data queue representing the root view in the view tree, and each following value representing an index in a view at a lower level in the view tree corresponding to a child view on the path; and a to-be-tested view is quickly found by the index method;

T23: after the to-be-tested view is found, a click event of the view is triggered;

T24: a code corresponding to the operations of step T22 and step T23 is written into a test case file, and a test case corresponding to the view is generated; and T25: step T22 to step T24 are repeated until test cases corresponding to all paths in the set of path information are generated.

The foregoing embodiments are preferred implementation modes of the present disclosure, but the embodiments of the present disclosure are not limited to the foregoing embodiments. Any other change, modification, replacement, combination, and simplification made without departing from the spirit and principle of the present disclosure shall be regarded as equivalent substitutions and fall within the scope of protection of the present disclosure.

The invention claimed is:

1. A method for automatically generating interactive test cases, comprising the following steps:

T1: traversing all clickable views in a user interface (UI) of an application program to obtain a traversal result, specifically comprising:

traversing all views in a view tree corresponding to the UI of the application program after the UI of the application program is displayed, and recording paths of clickable views in the view tree to obtain a set of path information of all clickable views in the view tree corresponding to the UI; and T2: automatically generating test cases corresponding to click events according to the traversal result obtained in step T1, specifically comprising:

respectively generating a corresponding test case for each piece of path information in the set of path information, finding, in the test case, a to-be-tested view in the UI of the application program according to path information of the view in the view tree, triggering a click event of the view to complete a click interaction test on the view, writing a code corresponding to the operation into a test case file, and generating a test case corresponding to the view, wherein step T2 further comprises:

T21: respectively automatically generating a test case corresponding to each piece of path information in the set according to the set of path information of clickable views in the view tree that is obtained by traversing all clickable views in the UI of the application program; and T22: when a test case is generated each time, extracting a piece of path information (s0, s1, s2 . . . ) from the set of path information, the first value in the data queue representing the root view in the view tree, and each following value representing an index in a view at a lower level in the view tree corresponding to a child view on the path.

2. The method for automatically generating interactive test cases according to claim 1, wherein step T1 comprises:

T11: displaying a UI of a to-be-tested application program in a test program;

T12: acquiring a root view in a view tree corresponding to the UI;

T13: traversing all views in the view tree from the root view;

T14: using a stack as a data structure for recording position information of child views during traversal, first, defining an index of the root view as 0, defining an index of the first child view under the same parent view as 0, defining an index of the second child view as 1, and so on; when a new view in the tree structure is traversed, if the new view is the first view in all child views under the same parent view, pushing an index of the new view into the stack, if the new view is a view other than the first view in all child views under the same parent view, popping the top of the stack first and then pushing the index of the new view into the stack, and in a case of returning to traverse an upper level in the view tree, popping the top of the stack; and using index information (s0, s1, s2, . . . ) stored in the stack from the bottom to the top at each moment to represent information of a path from the root view of the view tree to a current view;

T15: during traversal, determining whether a current child view is clickable by querying an attribute of the current child view, and for a clickable view, recording path information (s0, s1, s2, . . . ) of the view in the view tree that is stored in the stack; and T16: after the whole view tree is traversed, obtaining a set of path information of all clickable views in the view tree.

3. The method for automatically generating interactive test cases according to claim 1, wherein step T2 further comprises after T22:

T23: after a to-be-tested view is found, triggering a click event of the view; and T24: writing a code corresponding to the operations of step T22 and step T23 into a test case file, and generating a test case corresponding to the view; and T25: repeating step T22 to step T24 until test cases corresponding to all paths in the set of path information are generated.

* * * * *